United States Patent [19]
Teramachi

[11] 3,762,009
[45] Oct. 2, 1973

[54] METHOD OF PRODUCING SPLINE BEARINGS

[76] Inventor: Hiroshi Teramachi, 34-8 Higashitamagawa 2-chome, Setagaya-ku, Tokyo, Japan

[22] Filed: June 14, 1971

[21] Appl. No.: 152,900

[30] Foreign Application Priority Data
July 3, 1970 Japan.................................. 45/57727

[52] U.S. Cl........... 29/149.5 R, 29/159.2, 29/527.5, 164/76
[51] Int. Cl............................................. B23p 11/00
[58] Field of Search..................... 29/149.5 R, 159.2, 29/527.5; 164/76

[56] References Cited
UNITED STATES PATENTS
3,583,050  6/1971  Teramachi...................... 29/527.5 X
2,252,351  8/1941  Paulus............................. 29/149.5 R
3,465,425  9/1969  Leidenfrost....................... 164/76 X

*Primary Examiner*—Charles W. Lanham
*Assistant Examiner*—D. C. Reiley, III
*Attorney*—George B. Oujevolk

[57] ABSTRACT

A method of producing spline bearings for transmitting a rotational torque in which one member or a spline shaft produced by cutting and grinding is used as a core which is placed in the other member or a metallic mold adapted to mold by casting an outer race of a spline bearing. A molten alloy is poured in the cavity of the metallic mold in the form of the outer race of the spline bearing and allowed to cool and solidify so as to mold the outer race by casting. After being molded, the outer race is uniformly beaten to form a small clearance between the shaft and the outer race, so that a spline bearing of high precision can be produced.

2 Claims, 6 Drawing Figures

PATENTED OCT 2 1973

INVENTOR.

BY

METHOD OF PRODUCING SPLINE BEARINGS

BACKGROUND OF THE INVENTION

1. Field of the Invention

This invention relates to methods of producing spline bearings, and more particularly it is concerned with a method of producing spline bearings of high accuracy and precision with high efficiency and by a simple means of pouring a molten alloy into the cavity of a metallic mold in the form of an outer race of a spline bearing in which a spline shaft produced by cutting and grinding is inserted.

2. Description of the Prior Art

Generally, when spline bearings for transmitting a rotational torque are produced, it has hitherto been the usual practice to produce a spline shaft and an outer race separately by machining operations. Any error committed when these members are worked on or an error committed in indexing the spline angle, for example, has tended, even if the error is small, to cause improper contact between the spline shaft and outer race in assembling or in service, with a result that partial wear is caused and abnormal noises are produced. This condition adversely affects the transmission of a rotational torque to other members.

SUMMARY OF THE INVENTION

One object of the invention is to provide a method of producing spline bearings which obviates an error which might inevitably be committed in machining operation or an error in the spline indexing angle, for example, committed when one member is built in the other member, and which is permitted to produce an outer race formed with recesses of high precision finish adapted to receive therein projections of the spline shaft by placing one member or the spline shaft for transmitting a rotational torque produced by machining in a metallic mold which is adapted to form the other member or the outer race, pouring a molten alloy in the cavity of the metallic mold, and by beating uniformly the outer surface of the outer race to form a small clearance between the outer race molded by casting and the spline shaft inserted therein so that slip may occur between them.

Another object of the invention is to provide a method of producing spline bearings which eliminates the need to effect precise machine finishes in indexing the spline angle of a spline shaft because the spline shaft is used as a reference for molding an outer race by casting.

The fact that ordinary (not precise) machine finishes are tolerated in working on the spline shaft according to this invention makes it possible to produce spline bearings on a mass production basis and to reduce production cost.

According to the present invention, there is provided a method of producing spline bearings for transmitting rotational torque comprising the steps of placing a spline shaft in a metallic mold adapted to mold by casting an outer race of a spline bearing, pouring a molten metal in the cavity of the metallic mold in the form of the outer race of the spline bearing to mold by casting the outer race which grips the spline shaft, and uniformly beating the outer peripheral portion of the outer race after removing the same from the metallic mold as a semi-finished product, whereby a small clearance can be formed between the outer race and the spline shaft so that the spline shaft may be permitted to slip in the axial direction relative to the outer race in the spline portions.

The objects of this invention can be accomplished by the combination of the steps making up the method according to this invention. Embodiments of this invention are described by way of illustration in the description set forth hereinafter with reference to the accompanying drawings.

BRIEF DESCRIPTION OF THE DRAWINGS

In the drawings which shows embodiments of the spline bearings and the method of producing the same according to this invention.

DESCRIPTION OF THE INVENTION

Figure 5:
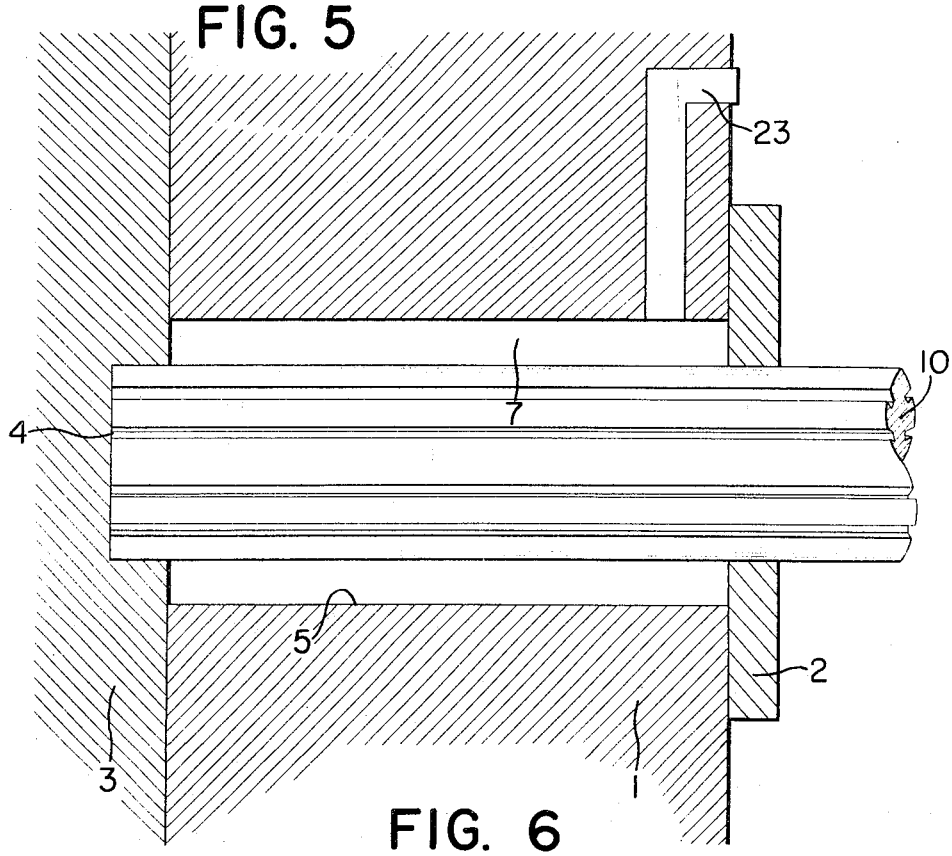
FIG. 5 is a sectional view showing the relative positions of the metallic mold and the spline shaft inserted therein when the spline bearing according to this invention is molded by casting.
Figure 6:
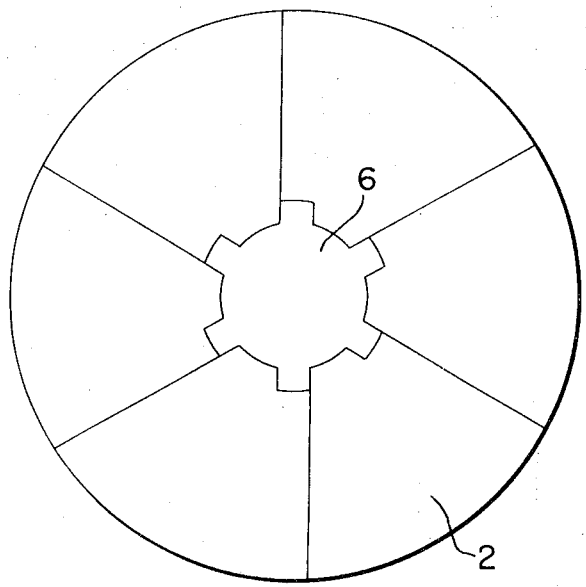
FIG. 6 is a side view showing a mold member which is of the same shape as the spline shaft inserted in the metallic mold and which is adapted to hold the shaft.

In FIGS. 5 and 6, there is shown a metallic mold comprising mold members 1, 2 and 3. The mold member 1 defining a cylindrical cavity 7 therein is disposed between a mold member 3 arranged adjacent one end of the mold member 1 and formed with an opening 4 in which a spline shaft 10 is fitted and a mold member 2 arranged adjacent the other end of the mold member 1 and constructed such that it opens in a plurality of directions but it is formed with an opening 6 of the same shape as the spline shaft 10 when an outer race is molded by casting.

The spline shaft 10 is fitted in the opening 4 in the mold member 3 so as to define a cavity 7 in the mold member 1 which cavity is shut off from outside by the mold member 2.

A molten aluminum alloy, zinc alloy or other material of good slide bearing properties is poured into the cavity 7 through inlet 23. When the poured molten material cools and solidifies, it is removed from the mold. An outer race 20 made of aluminum alloy, zinc alloy or other material is thus produced in the form of a primary product which firmly holds the spline shaft 10.

The outer portion of the outer race in the form of a semi-finished product is uniformly beaten in a direction normal to the axial center by taking care to avoid subjecting the spline shaft 10 to forces of high impact. This beating operation is effective to slightly stretch the outer race of aluminum alloy, zinc alloy or other material circumferentially, with a result that a small clearance is formed in each spline portion. The outer race 20 and the shaft 10 can thus form a kinetic pair which permits the members to slip relative to each other in the spline portions while transmitting a torque.

Figure 1:
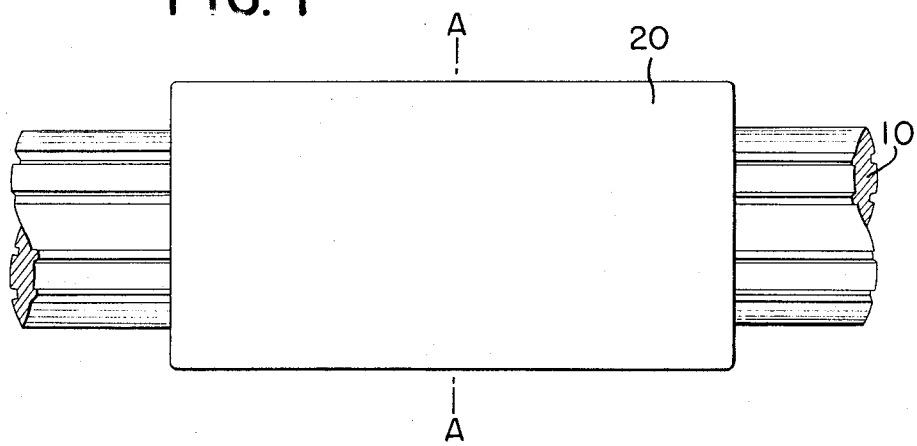
FIG. 1 is a front view of one embodiment of the spline shaft according to this invention.
Figure 2:
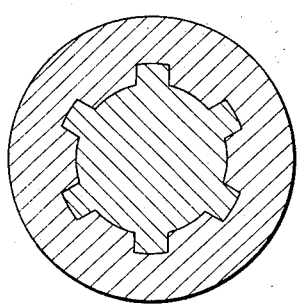
FIG. 2 is a sectional view taken along the line A—A of FIG. 1.

FIGS. 1 to 4 inclusive show the construction of the spline bearing produced by the method according to this invention. FIG. 1 is a front view of the outer race 20 holding the shaft 10 in place. FIG. 2 is a sectional view taken along the line A—A of FIG. 1 which shows the outer race and shaft being disposed such that there is a small clearance in each spline portion for permitting the shaft to slip axially relative to the outer race and to transmit a torque.

Figure 3:
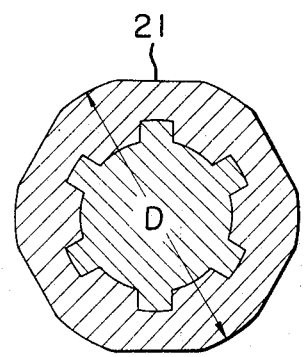
FIG. 3 and FIG. 4 are sectional views of other embodiments of the spline bearing according to this invention.
Figure 4:
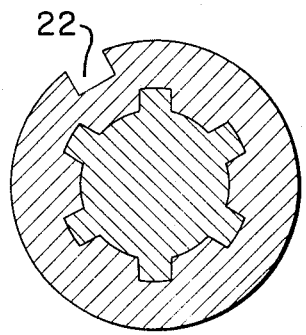

In the embodiment shown in FIG. 3, the outer race is formed on its outer circumference with a number of planar surfaces 21 disposed adjacent convex surfaces. In the embodiment shown in FIG. 4, the outer race is formed in its outer peripheral portion with a key way 22. The provision of planar surfaces 21 in the embodiment of FIG. 3 and the key way 22 in the embodiment of FIG. 4 facilitates the transmission of a torque to a member mounted on the outer circumferential surface of the outer race 20.

Conventional spline joints of the type described have hitherto been produced by machining the shaft and outer race separately. Conventional methods thus have a disadvantage in that a small error committed in indexing the spline angle or other operation has tended to result in improper contact between the outer race and shaft, thereby causing partial wear and tear and producing undesirable noises.

This disadvantage of methods of prior art is obviated by the method of producing spline bearings according to this invention. According to this invention, there is provided a method of producing spline bearings in which an outer race is molded by casting where a spline shaft has been inserted in a metallic mold. This permits to provide spline portions of high precision finish in which the shaft and outer race can be maintained in good contact with each other. Combined with the use of a material of good slide bearing properties for producing the outer race, the method according to this invention can produce spline bearings which have a long service life. Also, surface roughness of precise finishes can be imparted to the spline shaft by simple means, thereby permitting to reduce frictional dragging of the spline shaft on the outer race and to reduce noise. The molding of the outer race by casting eliminates the need to index the spline angle with high precision. The provision of a number of flat surfaces and planar surfaces adjacent one another or a key way formed by molding on the outer circumferential surface of the outer race offers an additional advantage in that additional machining can be eliminated hence an overall production cost can be reduced.

What I claim is:

1. A method of producing couplings for spline shafts for trasmitting a rotational torque, wherein the shaft is placed as a core in a mold defining the outer contour of the coupling, molten material of said coupling is then cast around said shaft, and, the shaft and molten material are cooled, the improvement comprises uniformly beating on the outer periphery of said coupling in the raidial direction, whereby the coupling is elongated to form a small clearance between said shaft and said coupling cast around said shaft.

2. A method as claimed in claim 1 wherein the molten material is an aluminum or zinc alloy.

* * * * *